June 12, 1951     A. L. LANGEL ET AL     2,556,927
BAKING PAN
Filed Nov. 22, 1947     2 Sheets-Sheet 1
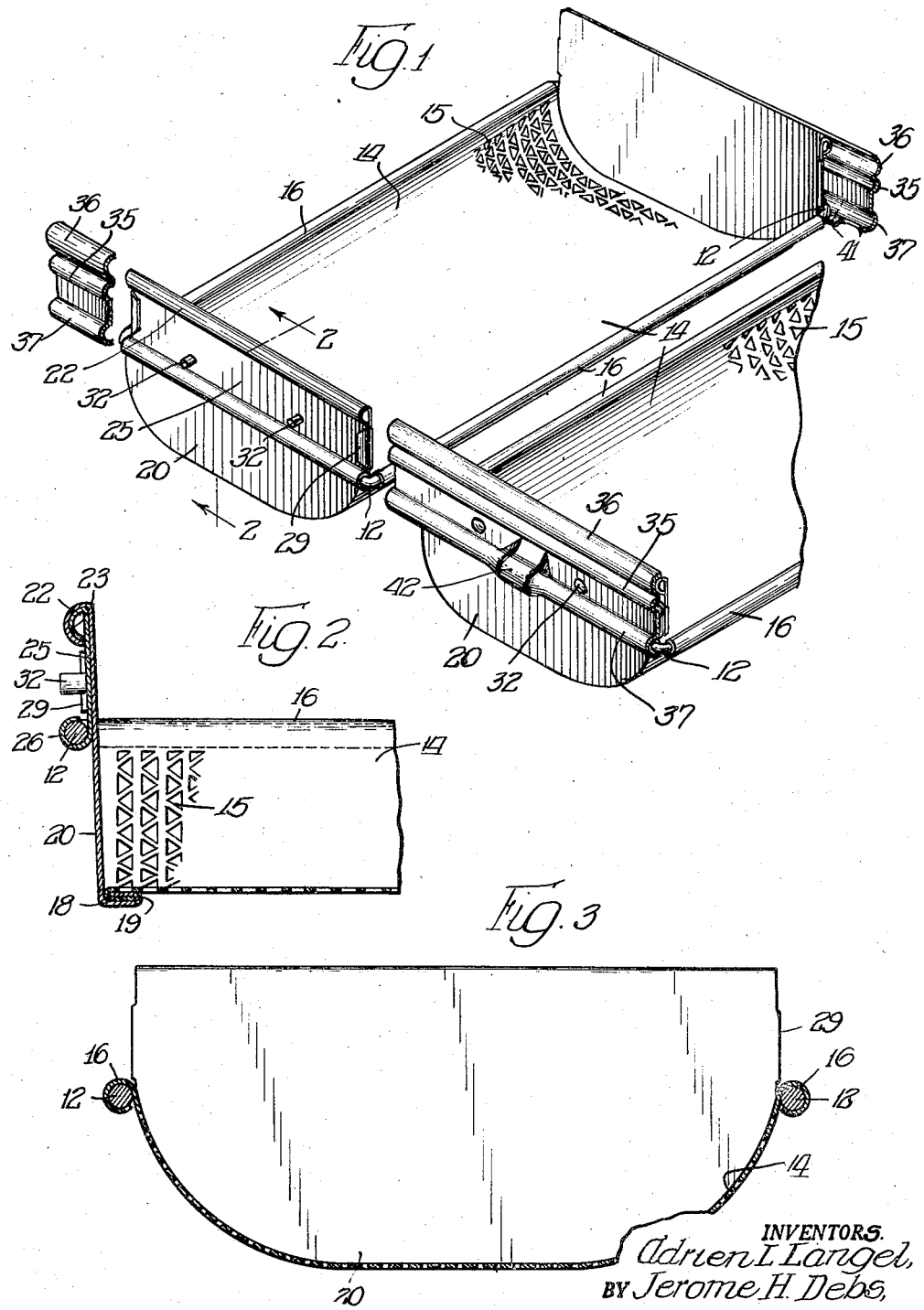
INVENTORS.
Adrien L Langel,
BY Jerome H. Debs, June 12, 1951  A. L. LANGEL ET AL  2,556,927
BAKING PAN
Filed Nov. 22, 1947  2 Sheets-Sheet 2
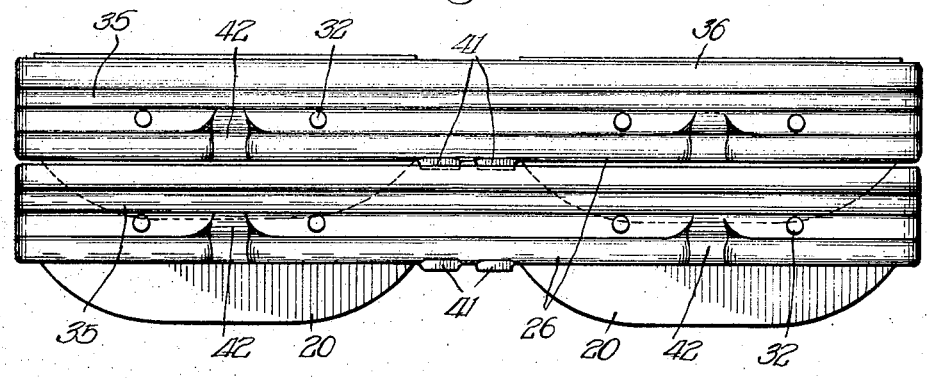
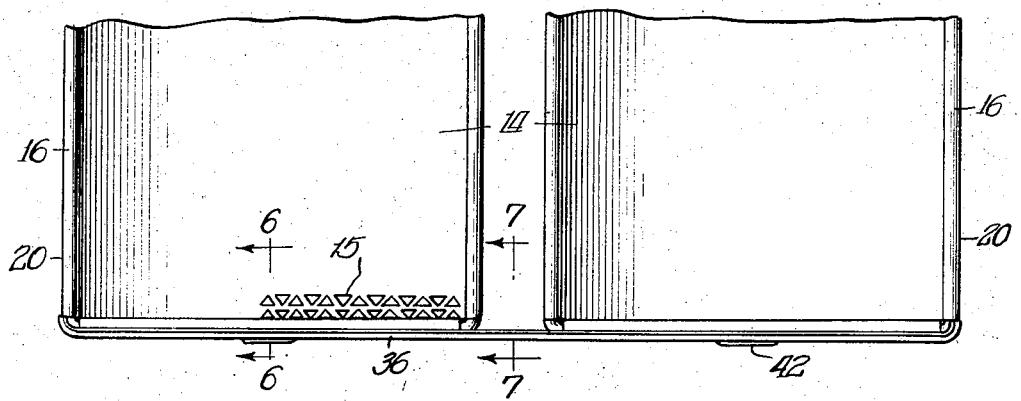
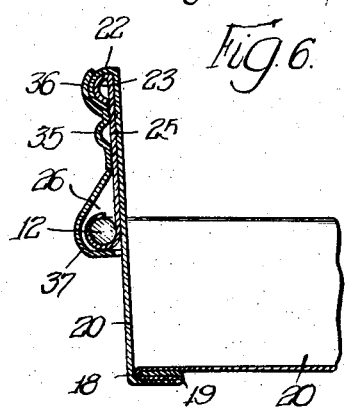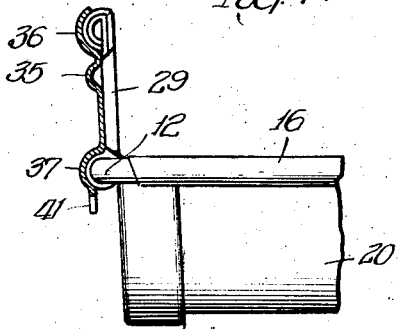
INVENTOR.
Adrien L. Langel,
BY Jerome H. Debs, Patented June 12, 1951

2,556,927

UNITED STATES PATENT OFFICE 2,556,927

BAKING PAN

Adrien L. Langel and Jerome H. Debs, Chicago, Ill., assignors to Chicago Metallic Manufacturing Company, Chicago, Ill., a corporation of Illinois Application November 22, 1947, Serial No. 787,550

1 Claim. (Cl. 220—4)

This invention relates to a new and improved baking pan, and more particularly to a pan of the hearth type for baking bread.

Pans of this character are provided with perforated bottoms and serve to support, rather than to shape, the bread. For commercial use, a plurality of individual loaf pans are secured together to form a pan set. The pan set may be handled as a unit, saving labor and space. Provision is made for stacking superposed pan sets in properly spaced and aligned relation.

It is an object of the present invention to provide a new and improved hearth pan set construction.

It is also an object to provide an pan construction in which the perforate pan bottoms are supported spaced above the surface upon which the pan rests.

It is an additional object to provide an pan without sharp, exposed edges or corners.

It is a further object to provide a pan which is simple in design and adapted for commercial production and use.

It is another object to provide a pan assembly having integral locating and stacking means.

Other and further objects will appear as the description proceeds.

We have shown certain preferred embodiments of the invention in the accompanying drawings, in which—

Figure 1 is a perspective view, partly broken away, showing the pan construction and assembly;

Figure 2 is a fragmentary section taken on the line 2—2 of Figure 1;

Figure 3 is a transverse section on one of the pan units;

Figure 4 is an end view of a pair of stacked pan sets;

Figure 5 is a fragmentary plan view of the pan sets of Figure 4;

Figure 6 is a fragmentary section taken on line 6—6 of Figure 5; and

Figure 7 is a fragmentary section taken on line 7—7 of Figure 5.

The pan construction includes a reinforcing member 12 which extends all around each one of the individual pan units going to make up the pan set. This reinforcing member is shown as a round bar, and the meeting ends of the bar may be welded, or otherwise secured together, or may be merely butted together intermediate of the sides. The bar would then be held in assembled relation by the grip of the side or end members which are folded around the reinforcing member.

The bottom and side member 14 has its central portion formed with a plurality of perforations 15 which, as shown, are triangular in shape and extend in rows transversely of the pan. These are the usual perforations permitting the passage of gases and heat in baking loaves of bread by what is known as the hearth method.

The sides 16 of the bottom and side member are folded over and around the side portions of the reinforcing member 12. It will be noted that these side portions 16 are not perforated and, consequently, their cut edges have no sharp points due to the perforations. This provides smooth edges which may be handled without injury to the user.

As best shown in Figure 2, the end of the bottom and side member 14 is folded downwardly and reversely at 18 to interlock with a reverse fold 19 of the end plate 20. It is further to be noted that this interlocking fold extends below the bottom of the pan so that these folds serve to support the pan bottoms clear of the surface upon which they rest.

The end member 20 is imperforate and extends inside and above the reinforcing member 12. The upper edge 22 of member 22 is folded outwardly and around a bead 23 which is formed on the end securing member 25. The lower edge 26 of the end securing member 25 is folded around the end portion of the reinforcing member 12 and may be spot welded thereto.

As best shown in Figure 1, the end member 20 is also provided with tabs 29 which are folded around the ends of the end securing member 25. The rivets 32 are carried by the end securing member 25, with their heads covered by the end plate 20. These rivets pass through the band iron 35 and secure the individual pans to the band iron to form the set. It will be noted that the band iron 35 has an upper bead 36 fitting over the upper outturned portion 22 of the end plate and a lower bead 37 fitting around the lower edge 26 of the end plate securing member 25 and the reinforcing member 12.

The elements which facilitate the locating and stacking of superposed pan sets are best shown on Figures 4 and 6. The lower edge of the band iron 35 is provided with downwardly extending lugs 41 located upon that portion of the band iron intermediate adjacent pan units. These lugs 41 serve to locate the pan sets relative to each other by engagement with the upwardly extending end portions of the pans of a lower set.

The supporting surfaces on the band iron 35 of the upper pan set include the outwardly extending sections 42 formed on the band irons at points at the middle portions of the ends of the pans. As shown in Figures 1 and 4, these sections 42 extend outwardly beyond the face of adjacent portions of the band iron and thus will support an upper pan set on a lower pan set even if the edges of the lower set become sprung outwardly in use. Thus, as shown in Figure 4, an upper pan set is supported from the upper edges 22 of the end plates 20 of a lower set by the lower faces of the sections 42. The extension of section 42 also takes care of the fact that the end walls are inclined slightly outward from the vertical. The locating lugs 41 are merely flat and the extending sections 42 have their inner faces closed so that neither affords any pocket for the accumulation of foreign matter or dirt. The band irons 35 are separate elements at each end of the pan set and their ends are curved around the ends of the upper portions of the end pans, as shown in Figures 4 and 5.

It will be apparent that the pans may readily be stacked, being separated by substantially the width of the band iron, since the band iron and its locating and supporting elements efficiently locate and positively support them. The formation of the band iron and its interlocking beads, together with the rivets, make a firm and rigid assembly adapted for repeated commercial use.

The construction shown is to be understood to be illustrative only, and we contemplate such modifications as come within the spirit and scope of the appended claim.

We claim:

A baking pan comprising a reinforcing bar member extending around the sides and ends of the pan, bottom and side wall members formed of a unitary structure with the upper edges of the side walls being folded about the reinforcing bar member, the portions of said side wall members which are folded about the reinforcing bar member being imperforate while the remaining portions of the bottom and side wall members are provided with closely spaced perforations, and an end wall member secured to the ends of the bottom and side wall member, the securing means comprising outwardly extending double seams with a portion extending below the plane of the pan bottom and forming supporting end rails for the pan.

ADRIEN L. LANGEL.
JEROME H. DEBS.

REFERENCES CITED

The following references are of record in the file of this patent:

UNITED STATES PATENTS

| Number | Name | Date |
| --- | --- | --- |
| 746,597 | Sochurek, Sr. | Dec. 8, 1903 |
| 1,302,664 | Jackson | May 6, 1919 |
| 1,671,450 | Ross | May 29, 1928 |
| 2,023,812 | Jackson | Dec. 10, 1935 |
| 2,116,975 | Kollman | May 10, 1938 |
| 2,150,623 | Jackson | Mar. 14, 1939 |
| 2,168,470 | Chandonia | Aug. 8, 1939 |
| 2,188,549 | Jackson | Jan. 30, 1940 |
| 2,305,014 | Langel | Dec. 15, 1942 |
| 2,329,772 | Langel | Sept. 21, 1943 |
| 2,347,694 | Langel | May 2, 1944 |
| 2,407,021 | Langel | Sept. 3, 1946 |